United States Patent Office 3,104,961
Patented Sept. 24, 1963

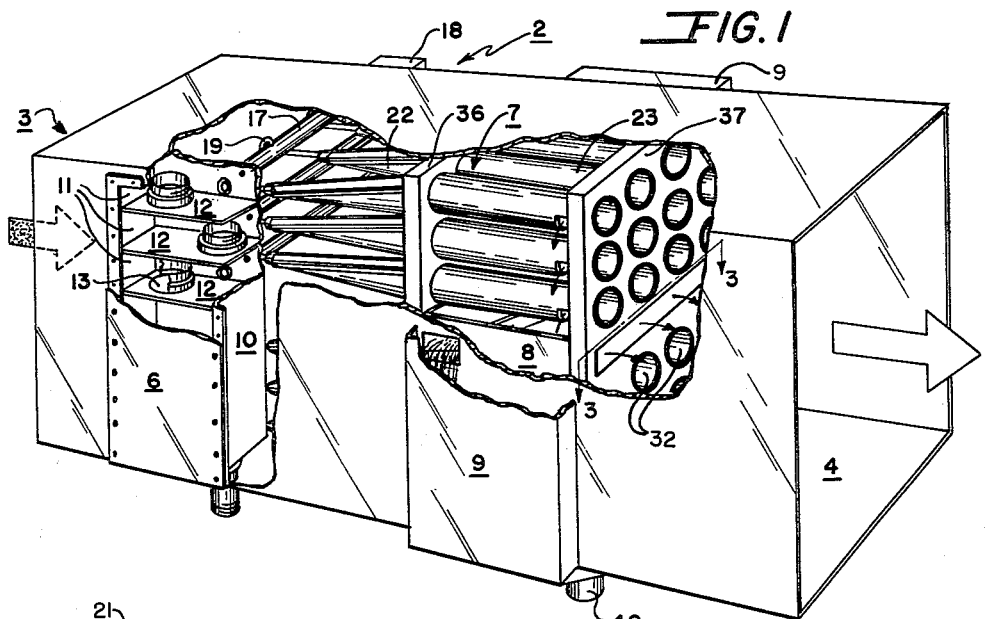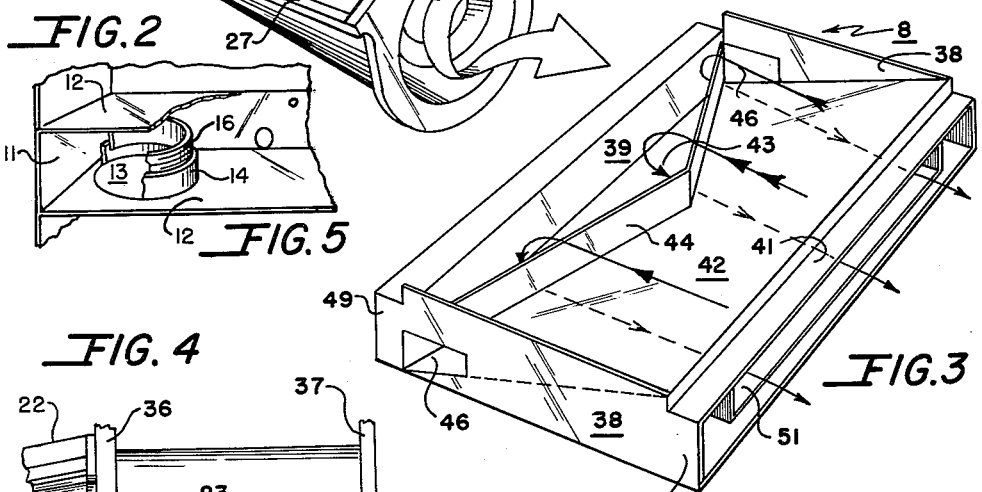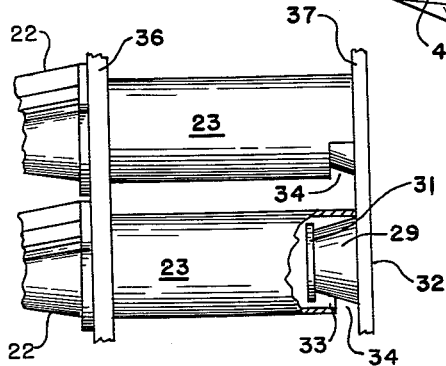

3,104,961
WET DUST SEPARATORS OR CONCENTRATORS OF THE CYCLONE TYPE
Karl L. Westlin, Louisville, Ky., assignor to American Air Filter Company, Inc., Louisville, Ky., a corporation of Delaware
Filed Nov. 23, 1959, Ser. No. 854,959
7 Claims. (Cl. 55—237)

This invention relates to dust separators or concentrators of the cyclone type and more particularly to improved dust separators of the vortexing, straight-through type as set forth in assignee's Patent No. 2,806,550, issued on September 17, 1957, to Karl L. Westlin.

The present invention finds particular application in dust separators of the type wherein dirty gas is introduced tangentially into a cylindrical body so as to whirl such dirty gas as it travels axially along the cylindrical body, thereby concentrating the dust load in the gas to the outer portion of the gas stream, permitting the clean gas to be removed from the center portion thereof. Various attempts have been made in such arrangements to contact the whirling gas with a liquid so that dust particles thrown outwardly by the whirling action of the gas are entrapped by such liquid and removed from the gas along with the removal of the liquid. However, in effecting the contact of the gas with the liquid, many difficulties and disadvantages have been confronted in the past. For example, in an effort to insure effective contact of the dirty gas with the liquid, large quantities of liquid have been used in the operation and, as a result, complex and expensive structural systems have been required to accommodate such large quantities of liquid. In addition, further complex structure has been required to separate the liquid and the gas after contact. Moreover, even with the utilization of such complex structure, some of the liquid still has not been separated from the gas but rather has been entrained therewith.

The present invention, recognizing these problems of the past, avoids them by utilizing the improved cyclonic concentrator features set forth in the aforementioned Patent No. 2,806,550 in combination with a liquid contact arrangement which insures effective gas-liquid contact in a straightforward and economic manner, requiring a minimum quantity of liquid to accomplish the same. In addition, the present invention provides a new and useful dust separator arrangement wherein efficient control of liquid introduced into such arrangement is obtained. Further, in accordance with the present invention, an efficient separation of the liquid after treatment is obtained so that the clean gas is rendered free of liquid entrainment and the liquid can be utilized subsequently by recirculation.

Various other features of the present invention will become obvious to one skilled in the art upon reading the disclosure set forth hereinafter.

More particularly, the present invention provides a dust separator for separating dust particles from a gaseous stream including a primary system and a secondary system; the primary system comprising cyclonic dust concentrating chamber means, gas inlet means peripherally disposed at one end of the chamber means to deliver dirty gas tangentially into the chamber means to vortex such dirty gas and concentrate the dust content along the wall of the chamber means, liquid inlet means adjacent the gas inlet means and cooperating therewith, liquid control means to control the quantity of liquid to the inlet means to provide a sheet of liquid concentrated along the wall of the chamber means and to form a liquid curtain over the gas inlet means, and outlet means in the chamber means downstream of the inlet means, the outlet means including a clean gas outlet to receive the clean gas stream passed along the inner portion of the chamber means adjacent the longitudinal axis thereof and a gas-liquid outlet to receive the gas-liquid concentrated along the wall of the chamber means; and the secondary system comprising gas-liquid separating means communicating with the gas-liquid outlet of the primary system and gas return means to combine the separated gas of the secondary system with the clean gas of the primary system.

It is to be understood that various changes can be made in the arrangement, form and construction of the apparatus disclosed herein by one skilled in the art without departing from the scope or spirit of the present invention.

Referring to the drawings which disclose one advantageous embodiment of the present invention:

FIGURE 1 is a partially broken away perspective view of a dust separator assembly incorporating the features of the present invention;

FIGURE 2 is an enlarged perspective view of one of the conical gas inlet sections of the assembly of FIGURE 1;

FIGURE 3 is an enlarged perspective view of one of the gas-liquid separating sections of the assembly of FIGURE 1, taken in a plane passing through line 3—3 of FIGURE 1;

FIGURE 4 is an enlarged partially broken away elevational view of a portion of a bank of outlet sections of the assembly of FIGURE 1; and FIGURE 5 is an enlarged perspective view of a portion of the liquid supply and control unit.

As disclosed in FIGURE 1 of the drawings, the dust collecting assembly incorporating the present invention includes elongated rectangular housing 2 having upstream dirty gas inlet 3 and downstream clean gas outlet 4. Positioned along the upstream portion of housing 2 is a liquid supply and control unit 6 which is connected to banks of dust concentrating members 7 positioned in housing 2 downstream of the liquid supply and control unit. The unit 6 and the banks of dust concentrators 7 comprise the primary system of the present invention. In the embodiment disclosed, two banks of concentrating members 7 are utilized (only a portion of each bank being disclosed), each bank having three spaced horizontally extending rows of spaced concentrating members 7. It is to be understood, in this connection, that the present invention is not limited to the particular arrangement disclosed and that other arrangements of banks also can be used if desired.

Communicating with each of the banks of dust concentrators 7 is a gas-liquid separator assembly 8 (only the upper gas-liquid separator assembly being shown in FIGURE 1), each of assemblies 8 in turn communicating with vertically extending drain troughs 9 mounted along the sides of housing 2, the separator assemblies 8 and the drain troughs 9 forming a portion of the secondary system of the present invention.

Referring more specifically to the liquid supply and control unit 6 (FIGURES 1 and 5), it can be seen that this unit includes a vertically extending weir box 10 mounted to one side of housing 2. Weir box 10 is divided into several superposed chambers 11 by spaced parallel horizontal partitions 12. Each partition is provided with an overflow aperture 13, the aperture of one partition being offset from the aperture immediately thereabove so as not to be in vertical alignment therewith. This offset arrangement serves to prevent a flow of liquid directly through adjacent apertures to thus render the weir box inoperative.

Surrounding the periphery of each aperture is an internally threaded, stationary weir ring 14, each weir ring 14 having threadedly mounted to its upper end an adjustable internal ring member 16. With such an arrangement it is possible to regulate the height of the weir in each chamber 11 to control the head of liquid in such chamber.

Communicating with each chamber 11 at a point below the upper surface of stationary weir ring 14 is one end of one of a set of spaced liquid distributing manifolds 17, each manifold 17 extending horizontally in a transverse manner across the gas flow path of housing 2. A vertically extending trough member 18 (only the top portion being shown in FIGURE 1) is mounted on the other side of housing 2 opposite weir box 6, trough 18 being communicably connected to the other end of each of the distributor manifolds 17 to permit a liquid flow-through in the manifolds and thus prevent possible manifold clogging. Each manifold 17 is provided with a series of outlets spaced along the longitudinal axis thereof and connected to each of such outlets is one end of a flexible conduit 19, the other end of each conduit 19 being connected to an apertured lug 21 which comprises a part of a dust concentrator 7.

The dust concentrators 7 disclosed advantageously are similar in many respects to the concentrators set forth in the aforementioned U.S. Patent No. 2,806,550. As such, each concentrator 7 includes an elongate hollow body having an inlet end section 22 and an outlet end section 23 positioned in end-to-end relationship to constrain gas to flow axially in one direction from the inlet section through the outlet section to the outlet end thereof. The inlet end section 22 serves to provide a conical space which increases cross-sectionally in the axial direction of gas flow. Each inlet end section 22 is provided with a peripheral inlet slot 24 extending along the length thereof and positioned to deliver gas tangentially into the conical space substantially throughout the length so as to vortex the gas therein and tend to concentrate the dust content in the outer portion of the gas stream as the stream approaches the large end of the space. Each slot 24 tapers lengthwise in a direction increasing in its width from the small end of section 22 to the large end thereof. The rate of this taper advantageously is such as to maintain, throughout the length of each cone, a substantial constant ratio of slot area to cone area at corresponding points. Although each slot 24 is disclosed as extending in a straight axial direction, it is to be understood that it also can be curved as it proceeds axially. It further is to be understood that several slots can be employed in each cone and that such slots can be positioned at various points along the cone. Slot 24 preferably is provided with outwardly flared guide vanes 26 and 27 so that the slot also tapers in the general direction of the air flow through it. The guide vane 27 comprises a more or less tangential extension of the conical wall of section 22. The smaller end of inlet section 22 is provided with an aperature 28 and, communicating with this aperture 28 is apertured lug 21. With such an arrangement, it is thus possible to introduce liquid into the inlet end section 22 from the liquid supply control unit 6 in a manner as described hereinafter.

Connected to the inlet end section 22 opposite the apertured lug 21 connection is one end of outlet end section 23. As in Patent No. 2,806,550, the area of the connecting ends of inlet and outlet section 22 and 23 advantageously should be equal or at least of magnitudes which avoid abrupt changes so as to distort gas flow conditions. Each outlet section 23 provides a cylindrical continuation of gas flow space proceeding axially from the outlet end of inlet section 22. This cylindrical continuation can be conical and of either increasing or decreasing cross-sectional area in the direction of axial air flow. Advantageously, however, it is in the form of a true cylinder of uniform cross-sectional area, which functions to accommodate the axially flowing vortex created in the inlet section, and gives the gas borne particles additional time to concentrate along with the liquid in the outer portion of the gas stream. It is to be understood that the length of this section should neither be too small or too large if optimum operating conditions are to be achieved.

Referring to FIGURE 4 of the drawings, it can be seen that the end of outlet section 23 opposite that end connected to the inlet end section 22 is provided with a conical gas outlet pipe 29 which terminates at its small end in an outwardly directed deflector 31, in the form of an annular flange. The conical pipe 29 serves to divide the outlet end of outlet section 23 into an inner axially disposed clean gas outlet 32 and an outer annular dust chamber or ring 33 to receive the outer portion of the gas stream containing the concentrated dust, as will be described hereinafter. In order to remove this outer portion of the gas stream from the outlet end section 23, this section is provided with a cutaway 34 which serves as a discharge opening for the secondary gas stream and the liquid introduced into the concentrator 7 through the lug 21.

As can be seen in FIGURE 1 of the drawings, the dust concentrators 7 are arranged in spaced parallel relationship to extend longitudinally along the dust chamber housing 2 with their upstream ends projecting through suitable openings in an upstream wall 36 and the downstream ends connected to suitable openings in a downstream wall 37. These spaced upstream and downstream walls 36 and 37 respectively serve to divide the upstream and downstream end of the housing 2 and, as above described, to support dust concentrators 7 in sets of selected banks.

Referring to FIGURES 1 and 3 of the drawings, it can be seen that the spaced upstream and downstream walls 36 and 37 also serve to support the extremities of the gas-liquid separator assemblies 8. In the advantageous embodiment disclosed, and as above described, two such assemblies 8 are utilized. One assembly 8 serves to accommodate the dirty gas-liquid stream from the cutaways 34 of the upper bank of dust concentrators 7 (as can be seen in FIGURE 1), the other assembly serving to accommodate the dirty gas-liquid stream from the cutaways 34 of the lower bank of spaced parallel concentrator tubes 7 (not shown). Each separator assembly 8 (FIGURE 3) is of rectangular shape and includes side wall members 38 and the upstream and downstream end wall members 39 and 41 respectively. Positioned between side wall 38 and sloping downwardly from the upper portion of downstream end wall 41 toward the lower portion of the upstream end wall 39 is drain panel 42. The upstream part of drain panel 42 is cut away to provide a triangular gas outlet aperture 43 between it and the upstream end wall 39 and a vertically extending V-shaped wall 44 is provided to extend along the peripheral edges of two sides of the triangular aperture 43. It is to be noted that vertical wall 44 is of sufficient height to prevent passage of liquid thereover but yet to permit free passage of gas in the secondary system through aperture 43. Provided in both side walls 38 downstream of the V-shaped vertical wall 44 are drain slots 46, these drain slots 46 communicating in turn with the drain troughs 9 mounted on the side of housing 2. A suitable drain outlet 48 is connected to each of the drain troughs 9 and, in a manner not shown, liquid passing through drain outlets 48 can then be passed on to a settling sump for disposal or recirculation to the liquid supply and control system aforedescribed.

It is to be noted that upstream and downstream end walls 39 and 41 of dirty gas-liquid separator 8 are provided with rectangular lips 49 and 50 respectively adapted to engage with openings in the upstream and downstream walls 36 and 37 respectively of housing 2. Disposed within the rectangular lip 50 of wall 41 is a metering orifice 51 which serves to pass the secondary gas which is passed through the triangular aperture 43 and beneath drain panel 42 toward the clean gas outlet where it combines with clean gas which passes through the clean gas outlets 32 of concentrators 7. It is to be understood that this metering orifice should be of a preselected size to permit an efficient separation by the separator assembly 8 of the gas from the gas-liquid stream passing through cutaways 34 of concentrators 7. If the metering orifice is too large, it will result in the passage of too much gas through the secondary system with consequent entrainment of liquid therewith. Advantageously, it is desirable that the metering orifice be of such size as to accommodate in the secondary system approximately 10% to 20% of the total gas that is cleaned. It also is to be understood that this percentage not only is determined by the size of the metering orifice but also by the resistance in the primary and secondary systems. Further, it is to be understood that if desired, it is possible to eliminate the entire separator section 8 and recirculate the gas from cutaways 34 to the inlet plenum by means of a fan, taking off the liquid by gravity and passing the same to a hopper. Further, it is possible to pass the secondary gas by the means of a duct and fan to an outlet plenum with the primary air.

In a typical operation of the aforedescribed inventive apparatus, liquid, advantageously water, is fed into the top chamber 11 of weir box 9 (from a supply source not shown) at a rate sufficient to insure a slight overflow from the bottom chamber 11 in the weir box, the weir ring 16 in each chamber being adjusted to insure that there is a proper amount of liquid fed into the concentrators 7 through manifolds 17 and apertured lugs 21 so that the inner surface of each concentrator wall is covered with a thin liquid film. In one typical operation, it was found advantageous to feed liquid into the system at the rate of 1 to 1¼ gallons of liquid per 1,000 cubic feet of primary air flow. At the same time that liquid is fed into the system, dirty gas passes to the dirty gas inlet 3 and through slots 24 of the inlet end sections 22 of the dust concentrators 7. Since the gas enters tangentially, it creates a vortex in the inlet end sections 22, subjecting the dust particles therein to intense centrifugation. Simultaneously, liquid entering into the cones through lugs 21 also is centrifuged as a thin liquid film along the walls of the cones by the centrifuging gas, the film forming a curtain over the inlet slots 24 through which subsequent dirty gas passing into the system must flow. As a result of this action, some of the dust particles in the gas passing through the liquid curtains tend to be entrapped by the liquid at that stage of the operation. The remaining dust particles are centrifuged so as to concentrate along the outer portion of the gas flow as it moves toward the outlet end sections 23 of the cones 7. The length of the outlet end sections 23 is designed to give such remaining particles sufficient time to concentrate in the outer portions before they reach the separating area. Since a liquid film is formed along the outer walls of the outlet sections by the centrifuging gas, the remaining particles, rather than strike the walls of the concentrator and bounce back into the main stream, are entrapped by such liquid film and passed off therewith. Thus, a more efficient dust separation in the primary system is insured. Upon reaching the separating area in the primary system, the centrally disposed clean gas passes through the clean gas outlets 32 while the outer portion of the gas stream, containing the concentrated dust and liquid, passes through cutaways 34 into the secondary system. At this point, the gas-liquid separator assembly 8 comes into operation to separate the gas from the liquid, the gas passing through aperture 43 and metering orifice 51 while the liquid with the dust entrained therein is restrained by the vertically extending wall 44 and is guided by such wall through drain slots 46, drain troughs 9 and drain outlets 48. As aforementioned, the liquid can be recirculated through a filter back to the liquid supply and control unit 6 or, if so desired, can be sent to a settling sump and distributed from that point.

The invention claimed is:

1. A dust separator for separating dust particles from a gaseous stream comprising a longitudinally extending cyclonic dust concentrating chamber having a conical portion at one end thereof, a longitudinal gas inlet slot extending along the peripheral length of the wall of said conical portion to deliver dirty gas tangentially into said chamber so as to vortex such dirty gas and concentrate the dust content along the wall of said chamber, liquid inlet means adjacent said gas inlet slot and cooperating therewith, liquid supply means connected to said liquid inlet means, said liquid supply means including a weir-overflow chamber to control the quantity of liquid passed to said liquid inlet means so as to provide a sheet of liquid concentrated along the wall of said chamber and to form a liquid curtain over said gas inlet slot through which dirty gas entering into said chamber must flow, and outlet means in said chamber downstream of said inlet means, said outlet means including a clean gas outlet to receive the clean gas stream passed along the inner portion of said chamber adjacent the longitudinal axis thereof and a gas-liquid outlet to receive the gas-liquid concentrated along the wall of said chamber.

2. A dust separator for separating dust particles from a gaseous stream comprising longitudinally extending cyclonic dust concentrating chamber means including a conical type portion at one end thereof, gas inlet means peripherally disposed along the side wall of said conical type portion of said chamber means and extending along a portion of the length thereof to deliver dirty gas tangentially into said chamber means to vortex such dirty gas and concentrate the dust content along the side wall of said chamber means, liquid inlet means removed from said gas inlet means and directed toward the dirty gas flow path at a position adjacent the apex of said conical type portion and upstream of said gas inlet means to cooperate therewith to provide a sheet of liquid concentrated along the side wall of said chamber means and to form a liquid curtain over said gas inlet means through which dirty gas entering into said chamber must flow, and outlet means in said chamber means downstream of said inlet means, said outlet means including a clean gas outlet to receive the clean gas stream passed along the inner portion of said chamber adjacent the longitudinal axis thereof and a gas-liquid outlet to receive the gas-liquid concentrated along the side wall of said chamber.

3. A dust separator for separating dust particles from a gaseous stream comprising a primary system and a secondary system; said primary system comprising a longitudinally extending cyclonic dust concentrating chamber means including a conical type portion at one end thereof, gas inlet means peripherally disposed along the side wall of said conical type portion of said chamber means and extending along the length thereof to deliver dirty gas tangentially into said chamber means to vortex such dirty gas and concentrate the dust content along the side wall of said chamber means, liquid inlet means removed from said gas inlet means and directed toward the dirty gas flow path at a position adjacent the apex of said conical type portion and upstream of said gas inlet means to cooperate therewith to provide a sheet of liquid concentrated along the side wall of said chamber means and to form a liquid curtain over said gas inlet means through which dirty gas entering into said chamber must flow, and outlet means in said chamber means downstream of said inlet means, said outlet means including a clean gas outlet to receive the clean gas stream passed along the inner portion of said chamber means adjacent the longitudinal axis thereof and a gas-liquid outlet to receive the gas-liquid concentrated along the side wall of said chamber means; and, said secondary system including gas-liquid separating means communicating with the gas-liquid outlet of said primary system and means to combine the separated gas with said clean gas of said primary system.

4. A dust separator for separating dust particles from a gaseous stream comprising a longitudinally extending cyclonic dust concentrating chamber means including a conical type portion at one end thereof, gas inlet means peripherally disposed along the side wall of said conical type portion of said chamber means and extending along the length thereof to deliver dirty gas tangentially into said chamber means to vortex such dirty gas and concentrate the dust content along the side wall of said chamber means, liquid inlet means removed from said gas inlet means and directed toward the dirty gas flow path at a position adjacent the apex of said conical type portion and upstream of said gas inlet means to cooperate therewith, adjustable liquid control means to control the quantity of liquid to said inlet means to provide a sheet of liquid concentrated along the side wall of said chamber means and to form a liquid curtain over said gas inlet means through which dirty gas entering into said chamber must flow, and outlet means in said chamber means downstream of said inlet means, said outlet means including a clean gas outlet to receive the clean gas stream passed along the inner portion of said chamber means adjacent the longitudinal axis thereof and a gas-liquid outlet to receive the gas-liquid concentrated along the side wall of said chamber means.

5. A dust separator for separating dust particles from a gaseous stream comprising a longitudinally extending cyclonic dust concentrating chamber having a conical type portion at one end thereof, a longitudinal gas inlet slot extending along the peripheral length of the wall of said conical portion to deliver dirty gas tangentially into said chamber so as to vortex such dirty gas and concentrate the dust content along the wall of said chamber, liquid inlet means removed from said gas inlet means and directed toward the dirty gas flow path at a position adjacent the apex of said conical type portion and upstream of said gas inlet means to cooperate therewith to provide a sheet of liquid concentrated along the side wall of said chamber and to form a liquid curtain over said gas inlet slot through which dirty gas entering into said chamber must flow, and outlet means in said chamber downstream of said inlet means, said outlet means including a clean gas outlet to receive the clean gas stream passed along the inner portion of said chamber adjacent the longitudinal axis thereof and a gas-liquid outlet to receive the gas-liquid concentrated along the wall of said chamber.

6. A dust separator for separating dust particles from a gaseous stream comprising a primary system and a secondary system; said primary system comprising a longitudinally extending cyclonic dust concentrating chamber including a conical type portion at one end thereof, gas inlet means peripherally disposed along the side wall of said conical type portion of said chamber and extending along the length thereof to deliver dirty gas tangentially into said chamber so as to vortex such dirty gas and concentrate the dust content along the side wall of said chamber, liquid inlet means removed from said gas inlet means and directed toward the dirty gas flow path at a position adjacent the apex of said conical type portion and upstream of said gas inlet means to cooperate therewith, liquid control means to control the quantity of liquid to said inlet means so as to provide a sheet of liquid concentrated along the side wall of said chamber and to form a liquid curtain over said gas inlet means through which dirty gas entering into said chamber must flow, and outlet means in said chamber downstream of said inlet means, said outlet means including a clean gas outlet to receive the clean gas stream passed along the inner portion of said chamber adjacent the longitudinal axis thereof and a gas-liquid outlet to receive the gas-liquid concentrated along the side wall of said chamber; and, said secondary system including gas-liquid separating means communicating with the gas-liquid outlet of said primary system and means to combine the separated gas with the clean gas of said primary system.

7. A dust separator for separating dust particles from a gaseous stream comprising a primary system and a secondary system; said primary system comprising a longitudinally extending cyclonic dust concentrating chamber including a conical type portion at one end thereof, gas inlet means peripherally disposed along the side wall of said conical type portion of said chamber and extending along the length thereof to deliver dirty gas tangentially into said chamber so as to vortex such dirty gas and concentrate the dust content along the side wall of said chamber, liquid inlet means removed from said gas inlet means and directed toward the dirty flow path at a position adjacent the apex of said conical type portion and upstream of said gas inlet means, liquid control means to control the quantity of liquid to said inlet means so as to provide a sheet of liquid concentrated along the side wall of said chamber and to form a liquid curtain over said gas inlet means through which dirty gas entering into said chamber must flow, and outlet means in said chamber downstream of said inlet means, said outlet means including a clean gas outlet to receive the clean gas stream passed along the inner portion of said chamber adjacent the longitudinal axis thereof and a gas-liquid outlet to receive the gas-liquid concentrated along the side wall of said chamber; and, said secondary system including gas-liquid separating means communicating with the gas-liquid outlet of said primary system and means to combine the separated gas with the clean gas of said primary system, said gas-liquid separating means including a downwardly inclined liquid drain pan having a liquid restraining wall at the lower edge thereof and a gas passage adjacent said restraining wall opposite said drain pan, said gas passage communicating with said clean gas stream of said primary system adjacent said clean gas outlet.

References Cited in the file of this patent

UNITED STATES PATENTS

| | | |
|---|---|---|
| 1,034,463 | Johnson | Aug. 6, 1912 |
| 1,130,849 | Seymour | Mar. 9, 1915 |
| 1,253,766 | Alden | Jan. 15, 1918 |
| 1,673,732 | Brooks | June 12, 1928 |
| 1,888,603 | Maulhe | Nov. 22, 1932 |
| 2,192,214 | Wier | Mar. 5 1940 |
| 2,259,032 | Fisher | Oct. 14, 1941 |
| 2,259,034 | Fisher | Oct. 14, 1941 |
| 2,351,864 | Linderman | June 20, 1944 |
| 2,574,370 | Bailey | Nov. 6, 1951 |
| 2,806,550 | Wistlin | Sept. 17, 1957 |
| 2,852,239 | Vicard | Sept. 16, 1958 |

FOREIGN PATENTS

| | | |
|---|---|---|
| 1,056,590 | Germany | May 6, 1959 |